United States Patent [19]

Kivelä

[11] Patent Number: 4,908,498
[45] Date of Patent: Mar. 13, 1990

[54] CONTROL FOR DELIVERY OF POWER TO HEATING ELEMENTS

[76] Inventor: Erkki Kivelä, Vierumäentie 9, SF-01450 Vantaa, Finland

[21] Appl. No.: 67,465
[22] PCT Filed: Oct. 9, 1986
[86] PCT No.: PCT/FI86/00112
§ 371 Date: Jun. 1, 1987
§ 102(e) Date: Jun. 1, 1987
[87] PCT Pub. No.: WO87/02539
PCT Pub. Date: Apr. 23, 1987

[30] Foreign Application Priority Data

Oct. 9, 1985 [FI] Finland ................... 853916

[51] Int. Cl.[4] ............................................. H05B 1/02
[52] U.S. Cl. .................................. 219/494; 219/483; 219/486; 219/508; 219/509; 307/38; 307/39
[58] Field of Search .......................... 219/483–486, 219/501, 507, 508, 509, 494, 497, 491, 490; 307/117, 30–41, 140

[56] References Cited

U.S. PATENT DOCUMENTS

| | | | |
|---|---|---|---|
| 3,982,097 | 9/1976 | Seider et al. | 219/486 |
| 4,090,062 | 5/1976 | Phillips et al. | 219/486 |
| 4,276,603 | 6/1981 | Beck et al. | 219/486 |
| 4,348,582 | 9/1982 | Budek | 307/140 |
| 4,362,949 | 12/1982 | McKenney et al. | 219/486 |
| 4,511,791 | 4/1985 | Desai et al. | 219/486 |

FOREIGN PATENT DOCUMENTS

| | | |
|---|---|---|
| 0040689 | 12/1981 | European Pat. Off. |
| 0121200 | 10/1984 | European Pat. Off. |
| 143993 | 6/1985 | European Pat. Off. |
| 2834960 | 2/1980 | Fed. Rep. of Germany |
| 2440580 | 5/1980 | France |
| 2461423 | 1/1981 | France |
| 152389 | 6/1985 | Norway |
| 820013 | 8/1982 | PCT Int'l Appl. |

Primary Examiner—M. H. Paschall
Attorney, Agent, or Firm—Kramer, Brufsky & Cifelli

[57] ABSTRACT

The invention relates to a control and switching apparatus for electric heating, comprising a micro-processor-based operation control unit (2) provided with control switches, and a regulating circuitry unit (5) associated with said control unit and comprising a plurality of regulating circuits. At least some of the regulating circuits are connectable to electronic sensors (8), whereby the combined effect of measuring messages fiven by said sensors, control data from the operation control unit (2) as well as set values (6) selected by the regulators provides the basis on which the regulating circuits (5) are adapted to control the ON/OFF-switches of electric loads, said switches being triac-switches (9a). One regulating circuit can be modified to operate as a regulating circuit suitable for controlling an electric sauna stove, said circuit being connectable, by means of a selector device, in power transposition with one or several other regulating circuits.

8 Claims, 7 Drawing Sheets

| Switch N:O | Regulating circuit N:O |
|---|---|
| 1 | 1 |
| 2 | 2 |
| 3 | 3 |
| 4 | 6 |
| 5 | 7 |
| 6 | 8 |
| 7 | 11 |
| 8 | 12 |

CONTROL FOR DELIVERY OF POWER TO HEATING ELEMENTS

BACKGROUND OF THE INVENTION

In electrically heated houses, the heating control is normally effected with thermostats, one in each room.

An object of the invention is to provide a microprocessor-based apparatus suitable for the roomwise heating control and regulation of electrically heated houses in a manner that the heating of each room can be controlled and regulated in a centralized manner with a single apparatus.

A further object of the invention is to develop an apparatus which allows the addition of new functions to the heating control at minor extra costs.

Another object of the invention is to develop an apparatus whose functions can be designed variable for taking the requirements of various applications better into consideration.

A still further object of the invention is to provide a control apparatus that can be placed in the instrument space of an electricity centre or immediately nearby, the electric heating system of a house thus providing a simple unit.

SUMMARY OF THE INVENTION

For achieving these objects, the invention relates to an electric heating control and switching apparatus, comprising a microprocessor-based operation control unit, provided with control switches, and a regulating circuit unit, associated with said control unit and comprising a plurality of regulating circuits, each of said regulating circuits controlling directly the heating elements of a room.

An apparatus of the invention is characterized in that at least some of the regulating circuits can be connected to electronic sensors, whereby the combined effect of measuring messages given by said sensors, control data from the operation control unit as well as set values selected by the regulators provides the basis on which the regulating circuits are adapted to control the ON-/OFF-switches of electric loads, which are conventional prior known triac-switches. Each regulating circuit thus receives the necessary control and regulation data from roomwise temperature sensors, set value selection switches and an operation control processor. This three-way control of regulating circuits makes it possible to achieve the aims and objectives of the invention.

The use of triac-switches at control outputs offers the following advantages:
- possibility for zero-point connection thus minimization of mains interruptions,
- improved control precision by virtue of shorter operating cycles,
- prolonged service life compared to relays.

In a preferred embodiment of the invention, one of the regulating circuits of said regulating circuitry is preselected to be modified by means of a connection associated with the apparatus as a regulating circuit suitable for controlling an electric sauna stove and the apparatus comprises a selector device for switching said regulating circuit in power transposition optionally with one or several other regulating circuits.

An apparatus of the invention is preferably designed so as to comprise at least 10, preferably approximately 15 regulating circuits, just some of said circuits including their own thermometry, set value selection and control output while the rest of said regulating circuits include their own thermometry and control output, but their set value selections are common with the first-mentioned group of regulating circuits. In practical design, this is preferably embodied in a manner that the operating panel only includes temperature set value rotating switches for some of the regulating circuits and that a regulating circuits cross-switching means, included in the apparatus, the rest of said regulating circuits are freely selectable to follow the set value of a desired rotating switch.

The apparatus can be readily designed so that some of the regulating circuits can be used for lighting control. In that case, at least one of the electronic sensors used will be a dimmer switch, whereby the regulating circuit associated therewith is connectable to lighting control.

Other embodiments, details and features of the invention will be further described in the following specification with reference made to the accompanying drawings and enclosures.

DETAILED DESCRIPTION OF THE INVENTION

Figure 1:
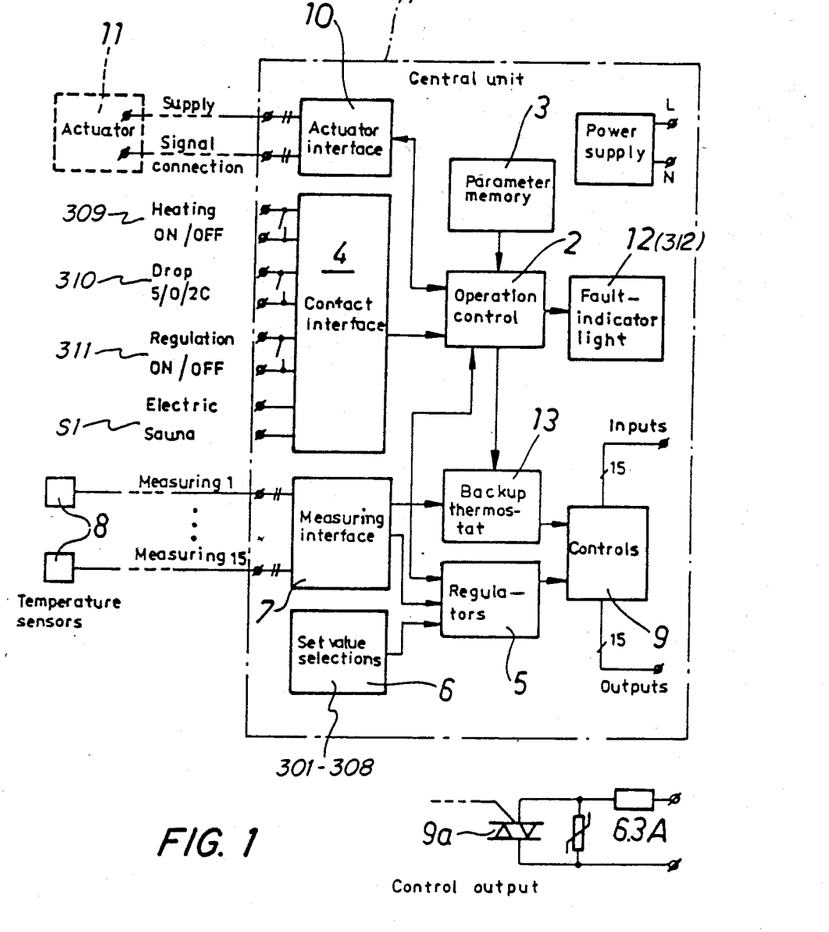
FIG. 1 shows an operating block diagram for a control apparatus.

In the block diagram shown in FIG. 1, all blocks included in a central unit 1 are fitted in a single assembly that can be fitted in standard electricty centres or encapsulated in its own housing. Reference numeral 2 designates a microprocessor-based operation control unit, based e.g. on the use of a single-capsule processor Motorola MC146805 E2. The use of a single-capsule processor provides for a simple embodiment of the digital section and a small number of components. Digital electronics can be mounted on a single card which also includes control switches and a fault-indicator light, which are part of the operating panel FIG. 3. The control unit 2 is provided with a parameter memory unit 3 that can be used to modify the properties of control unit 2 as required by various applications.

Figure 11:
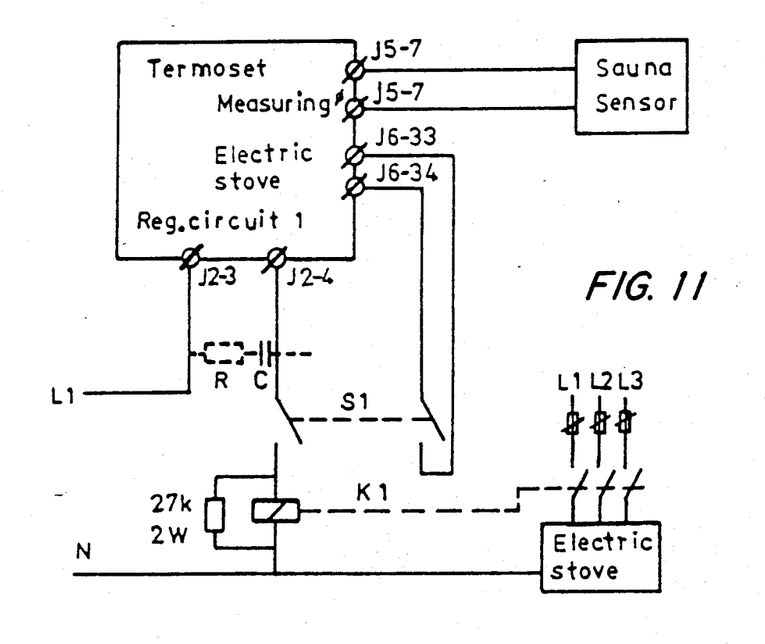

The operation control unit is associated via a contact interface 4 with operating panel 300 control switches (see FIG. 2 and FIG. 3), "heating ON/OFF" switch 309, "temperature drop —5/0/—2° C." switch 310, regulation control switch ON/OFF" switch 311 and electric sauna stove control switch (S1, FIG. 11.

Figure 13:
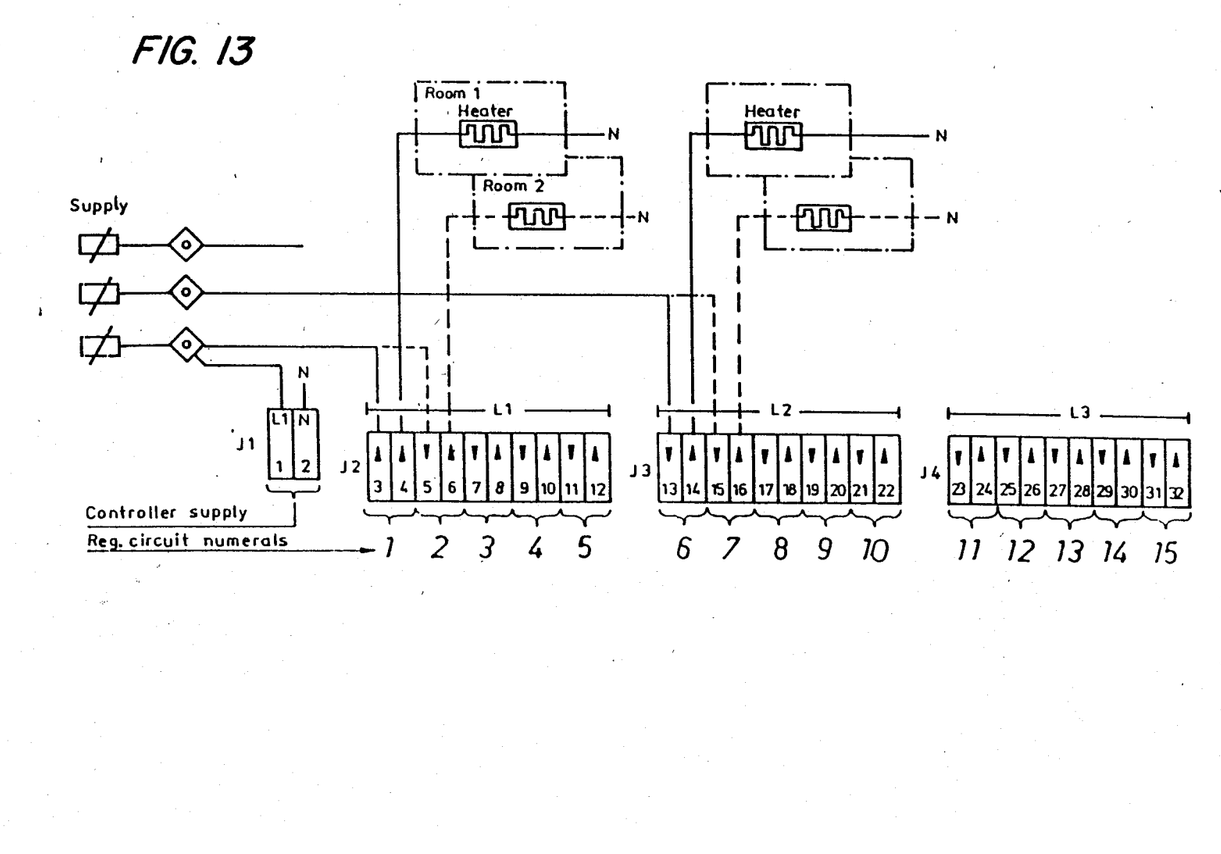
FIG. 13 illustrates the connection of heaters to the power supply terminals of this apparatus, the triac-switches controlled by regulating circuits being fitted between the pairwise arranged input and output connections of said terminals.

The control unit 2 is connected to a regulating circuit unit 5, including e.g. 15 regulating circuits for room temperatures. Each regulating circuit controls a triac-switch 9a fitted in a control output unit 9, electric power being supplied through said triac-switch directly to heating elements. Thus, the control output unit 9 is provided with 15 inputs and 15 outputs, said triac-switches 9a being fitted therebetween. These inputs and outputs are shown in FIG. 1 and FIG. 13 as mains voltage line terminals L1, L2 and L3.

Room temperature sensors 8 can be linked via a measuring interface 7 (see FIG. 12) to the regulating circuits of regulating circuit unit 5. Set value selections for regulating circuits can be made by means of rotating switches included in unit 6 and shown on the operating panel of FIG. 3 with references 1–8. Thus, there are fewer set value switches than regulating circuits. For this reason, some of the regulating circuits are adapted by means of a special regulating circuits cross-switching means (FIG. 7) to follow as a slave circuit the set value of a desired, freely selectable rotating switch.

The operation control unit 2 is associated with an actuator interface 10, whereby said operation control unit 2 can be in serial data transmission contact with an external actuator 11. By way of interface 10, said control device 2 can supply data of measuring results, set values, states of controls and possible malfunctions e.g. at 4 sec intervals. On the other hand, operation of the entire apparatus and operation of the regulating circuits in regulating circuitry unit 5 can be remote-controlled by way of control device 2 by using commands issued by actuator 11 through interface 10. By virtue of a ready interface 10, the expansion of functions of this apparatus is possible without modifications to the control and switching apparatus. The question can be about an intelligent actuator, including a timer and capability of producing time programs. The actuator can, by way of interface 10, positively or forcibly control the operation of a control and switching apparatus and monitor and control temperatures in a house.

For example, thermistor-type of sensors can be selected for temperature sensors 8. An advantage offered by thermistors is high sensitivity which is one of the factors leading to simple amplifier electronics.

In designing the regulating circuits of regulating circuitry unit 5 it is readily possible to consider eventual use for other purposes as well, e.g. for controlling outdoor lights on the basis of a lighting sensor or dusk switch.

A control and switching apparatus of the invention must include a backup function that can be switched on to control heating instead of a processor control, e.g. at the time of maintenance or malfunction. Therefore, the central unit is provided with a backup thermostat 13 that can be switched on operation by means of a regulation control switch associated with a contact interface 4 (see also FIGS. 3–6). In the OFF-position of a regulation control switch, said backup thermostat 13 controls all triac-switches 9a that are under the control of control output unit 9. The fixed set value of backup thermostat 13 is e.g. 21° C. and to said thermostat is connected a temperature sensor 8 for some room measuring.

The operation of operation control unit 2 proceeds as control cycles of fixed duration (e.g. 4 sec). Functions included in a control cycle are e.g. a read-out program for the control switches associated with contact interface 4, a read-out program for the set values issued by the rotating switches included in a set value selection unit 6, a measuring program for the temperature data issued by temperature sensors 8, a temperature regulation program on the basis of such data as well as a serial communications activation program (transmission). The regulation function file further includes a monitoring program to be run once every control cycle. The control apparatus runs tests on itself and checks on the intelligence of the operation. If a fault is found in the operation, it is reported to a user by switching on a fault-indicator light 12.

In some cases it may be necessary to control a greater power than possible with triac-switches (e.g. over 1400 W). In this case, use is made of "a selection 1" peak strip shown 800 in FIG. 2 and FIG. 8. By fitting the peak strip at a desired regulating circuit (1–15) a short-circuit bit, a relay operation is provided on the corresponding regulating circuit.

By means of "a selection 2" peak strip 1000 (FIG. 2 and FIG. 10), a regulating circuit "1" can be modified for sauna stove control by fitting a short-circuit bit between the peaks associated with regulating circuit 1.

Figure 10:
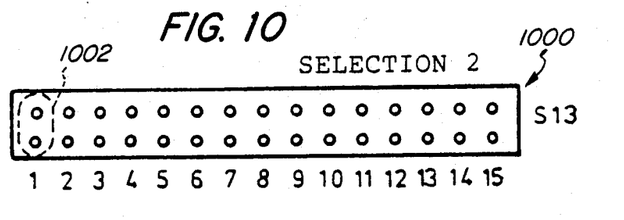

The "selection 2" peak strip 1000 can be used to connect one or several regulating circuits 2–15 to power transposition with regulating circuit 1 modified for sauna control by fitting the short-circuit bits between the peaks associated with regulating circuits chosen for power transposition. FIG. 11 illustrates a circuit diagram for connecting an electric sauna stove with the control of a control and switching apparatus of the invention. Thus, the central unit of the apparatus is provided with a separate sauna sensor and the control is effected by way of a contactor.

Figure 2:
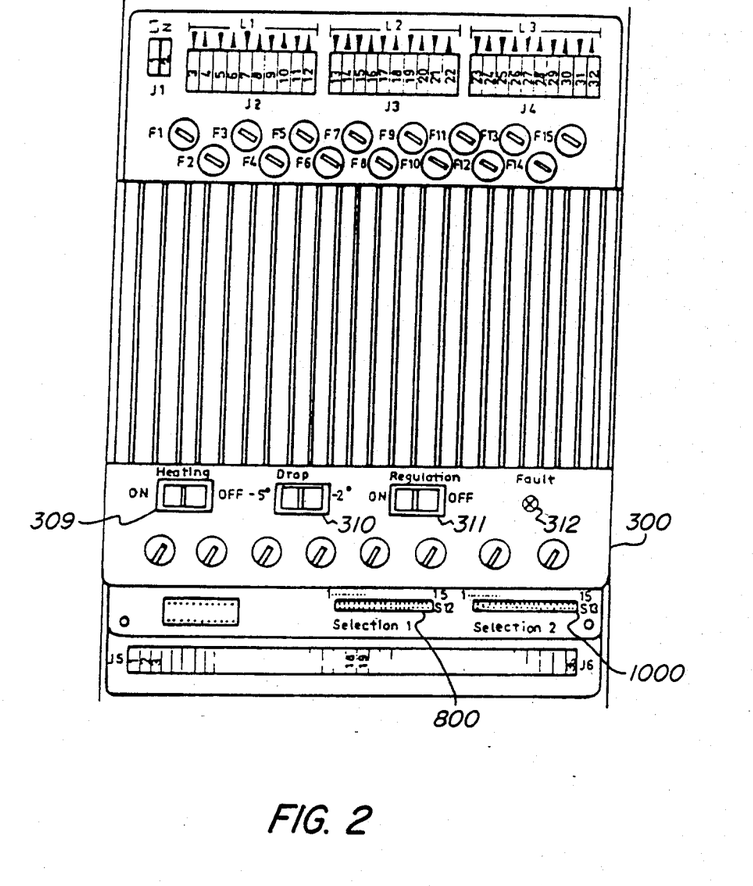
FIG. 2 is an elevation of a mechanical embodiment of said control apparatus.

The power and connecting electronics of central unit 1 of this control and switching apparatus for temperature measurements, contact inputs, a separate actuator and control outputs is mounted on a second card of the apparatus, said card including also a power source (e.g. +5 V) required by electronics. The triac-switches serving as power switches are mounted on a cooling panel (FIG. 1, part 4). The card for control circuits and the card for power circuits are positioned in a manner that their connecting terminals will be positioned on opposite sides of said cooling panel fitted with cooling ribs, as shown in FIG. 2.

FIGS. 3 through 6 show the operating panel 300 and functions of the switches 301–311 and indicator light 312 included therein.

Figure 3:
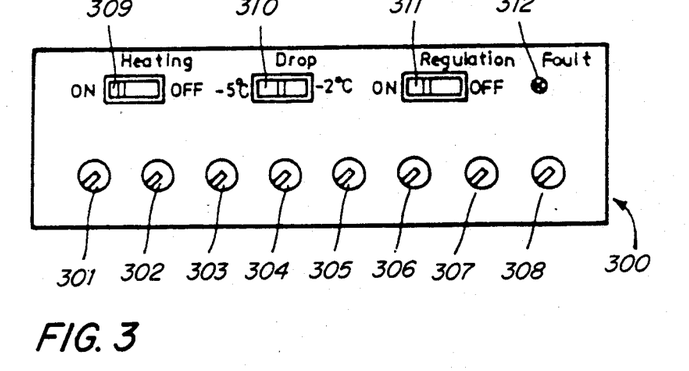
FIGS. 3-6 show an operating panel and functions of the switches included therein.

As best viewed in FIG. 3, switch 309 is a heating control ON/OFF switch. Switch 310 is a temperature drop selection switch, for selecting a temperature drop of $-5$, 0 or $-2°$ C. (degrees Celsius). Switch 311 is a regulation control ON/OFF switch. Lamp 312 is a fault detector light. Switches 301–308 are rotating switches which provide roomwise regulating circuits with a desired set values of 14° to 25° C.

Figure 4:
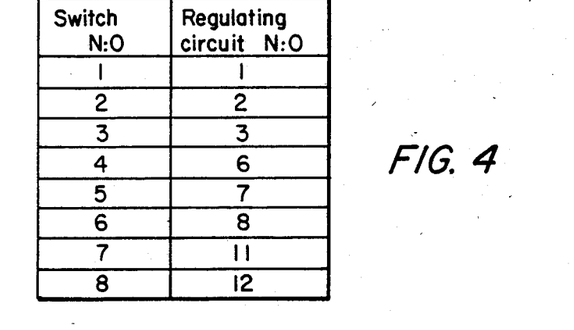

As shown in the table of FIG. 4, the eight rotating switches 301–308 correspond (match) to eight of the aforementioned fifteen regulating circuits in the regulating circuit unit 5 of FIG. 1. These regulating circuits are numbered 1, 2, 3, 6, 7, 8, 11 and 12 in the table.

With respect to the heating control ON/OFF switch 309, in the ON-position a micro-computer controls the roomwise regulating circuits (included in unit 5 of FIG. 1) according to the set temperature values (as provided by the rotating switches 301–308). In the OFF-position of the heating control switch 309, the micro-computer is not operating, nor is the heating on. The heating control switch has no effect on the operation of the sauna control.

Figure 5:
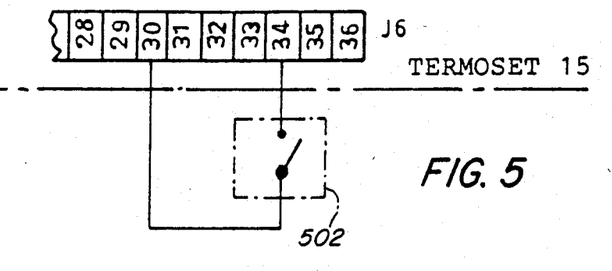

As shown in FIG. 5, heating can also be switched off by means of the closing time contact 502 of a tariff timer or one week program control as follows:

With respect to the temperature drop switch 310, the switch is tristable (three position), and achieves a temperature drop on all regulating circuits (included in the unit 5 of FIG. 1) simultaneously, either $-2°$ or $-5°$ C. down from the set values (of switches 301–308). The "0" position is for no temperature drop. However, the temperature is not permitted to drop below 13° C., in any case. For instance, if the set value (of one of the switches 301–308) is 15° C., and the temperature drop set switch 310 is set to $-5°$ C., the temperature is not permitted to drop to 10° C., but is limited to 13° C.

Figure 6:
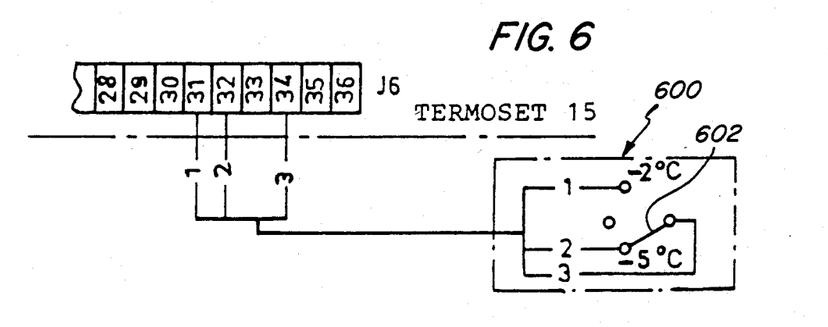

As shown in FIG. 6, the temperature drop can also be initiated by means of an external contact control 600. The control 600 includes a three-way switch 602 to initiate the aforementioned $-2, 0$ and $-5°$ C. temperature drops.

With respect to the regulation control ON/OFF switch 311, in the ON position, the microcomputer of the control apparatus is in normal operation. In the OFF position, heating is controlled by the backup thermostat of the apparatus, whose fixed set value is 21° C. Connected to the thermostat is a temperature sensor of room measuring 2. In the backup heating operation mode, all control outputs are controlled simultaneously. The regulation control switch 311 is useful in situations where the ambient temperature is too low for microcomputer operation and in case of malfunctions.

With respect to the fault indicator light 312, the controller runs tests on itself and checks on operation intelligence. If a fault is found in operation, it is reported to the user by switching on the fault indicator light 312. The fault indicator light 312 switches on if:

any of the measuring inputs is short circuited; any of the measuring inputs are open (e.g., sensor cable broken; any of the rotating switches for temperature set values (301–308) has stopped in an intermediate position; or the regulating circuits cross-switching means is off or incorrectly connected.

In the case of such a fault, a corresponding control output is automatically switched off.

FIGS. 7–11 illustrate application-wise programming of the apparatus by means of peak strips in the front panel.

Figure 7:
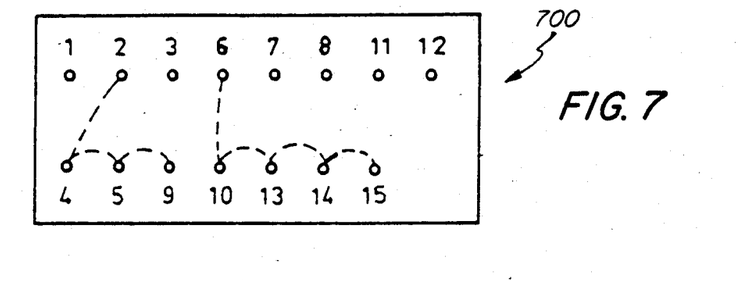
FIGS. 7-11 illustrates applicationwise programming of the apparatus by means of peak strips in the front panel.

FIG. 7 shows the cross switching means 700, and the connections to the fifteen regulating circuits (numbered 1–15) included in the regulator 5 of FIG. 1. As noted hereinbefore with respect to the table of FIG. 4, eight regulating circuits (nos. 1, 2, 3, 6, 7, 8, 11 and 12) correspond to the eight rotating switches 301–308 on the operating panel. The remaining seven regulating circuits (nos. 4, 5, 9, 10, 13, 14 and 15) are freely selectable (slave) regulating circuits.

In the cross-switching means, the regulating circuits are freely programmable as to which temperature set value switch 301–308 on the operating panel control which slave circuit (nos. 4, 5, 9, 10, 13, 14 and 15). This free programmability is illustrated by the dashed lines indicating jumpers between the regulating circuits.

If one of the freely selectable (slave) regulating circuits remains unused, it must be "chained" under a rotating switch (301–308) in the cross-switching means 700. (This is illustrated, for instance, by the dashed line connections between circuit nos. 4, 5 and 9.) Otherwise, the situation would be interpreted as a fault, and the fault indicator light 312 would come on, as previously discussed.

Figure 8:
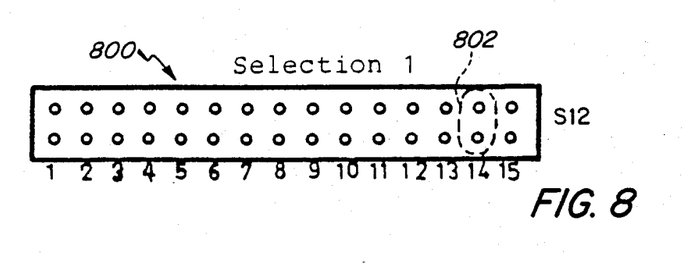
Figure 9:
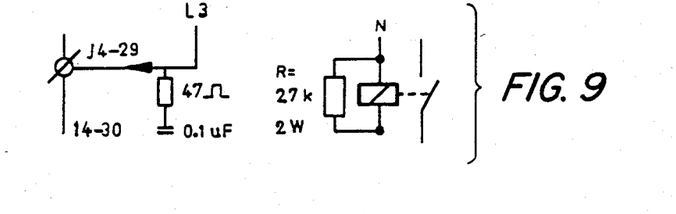

FIGS. 8 and 9 illustrate the relay operation of the regulating circuits (nos. 1–15). By way of example (selection 1), regulating circuit no. 14 is discussed. Relay operation on regulating circuit no. 14 is indicated by a dashed line 802. The alternative relay operation of control outputs is programmed with a short-circuit bit by placing it on the regulating circuit in question. In other words, in relay operation:

Short-circuit "n"=ON, regulating circuit no. "n", (where "n" is from 1 to 15)

In use, if the power of room space heaters exceeds 1400 W (Watts), a contractor control is used. Thus the regulating in question is programmed in relay operation and the contactor is circuited as shown in FIG. 9, e.g., for regulator circuit no. 14.

FIGS. 10 and 11 illustrate sauna control and power transposition for regulating circuits nos. 1–15. By way of example (selection 2), regulating circuit no. 1 is discussed, as indicated by the dashed line 1002. For regulating circuit no. 1, the peak strip selection 2 can be used to define the control of an electric sauna stove (heater). Sauna control and power transportation are effected by short circuiting the appropriate regulating circuit as follows:

Short circuit "1"=ON, reguating circuit "1"; Sauna control;

Short circuit "n"=ON, rregulating circuit "n"; power transportation (where "n" is from 2–15).

The electric sauna is connected to the Thermoset (Termoset) as illustrated in FIG. 11, which shows a sauna stove control switch, labeled S1, and a sauna stove control contactor, labeled K1. The sauna stove switches off automatically, and four hours later will restart with the switch S1. As the sauna stove switches on, the regulating circuits chosen for power transportation switch off.

Figure 12:
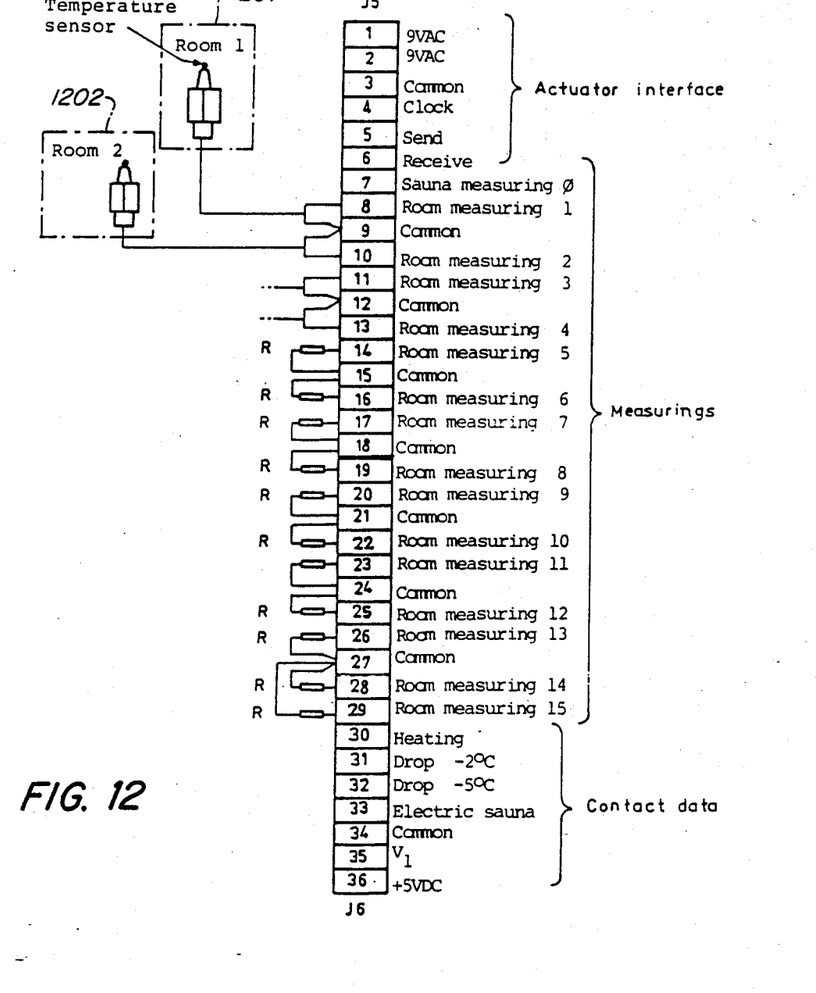
FIG. 12 illustrates switching of temperature sensors and actuator interface as well as contact data interface in the line terminal of the low-voltage section of this apparatus.

FIG. 12 illustrates the circuitry for temperature sensors, for instance a temperature sensor 1201 in a first room (Room 1) and a temperature sensor 1202 in a second room (Room 2); in other words, the witching of temperature sensors and the actuator interface, as well as the contact data interface in the line terminal of the low-voltage section of this apparatus. It should be noted that in the unused measuring spaces (e.g., rooms 5–15), it is necessary that a resistance "R" (R=47 kilo-ohms) be switched on (installed on the terminal strip J6) unless the sensor is on (hooked up). Otherwise, the processor would interpret the lack of a sensor as a fault (e.g., open circuit), with the aforementioned consequences.

FIG. 13 illustrates the circuitry for controller supply and heaters; in other words, the connection of heaters to the power supply terminals of this apparatus, the triac switches controlled by the regulating circuits being fitted between the pairwise arranged input and output connections of said terminals. Regulating circuits nos. 1–15 are illustrated. It should be noted that, when switching on, the controller supply and supply for the regulating circuits nos. 1–5 must be in the same phase.

What is claimed is:

1. An apparatus for controlling the delivery of power from a power source to a plurality of electric heating elements, said apparatus comprising:

a plurality of electronic switches for delivery of power from a power source to a plurality of heating elements;

a plurality of temperature sensors associated with said heating elements;

control means, responsive to said temperature sensors, for activating said electronic switches to provide a desired level of heat output; and selection means coupled to said electronic switches for selectively delivering both the output from each of said switches to a different heating element to deliver relatively low power to heating element, and the output from at least two of said electronic switches to one of said heating elements to deliver relatively high power to the one heating element.

2. An apparatus as set forth in claim 1 wherein each switch comprises a triac, the control means includes a plurality of regulating circuit means for activating said switches at phase angles corresponding to the desired levels of heat output, and the selection means includes means for switching one of the regulator circuit means in power transportation with at least one other of the regulator circuit means to deliver the power from the associated electronic switches to the one heating element.

3. An apparatus as set forth in claim 1 wherein said control means includes processor means, responsive to said temperature sensors and to set temperature values programmed into said processor means, for controlling the amounts of power delivered to said heating elements via said electronic switches to attain said set temperatures.

4. An apparatus as set forth in claim 2 wherein said control means includes processor means, responsive to said temperature sensors and to set temperature values programmed into said processor means, for controlling the amounts of power delivered to said heating elements via said electronic switches to attain said set temperatures.

5. An apparatus for controlling the delivery of power from a power source to a multiplicity of electric heating elements, said apparatus comprising:
    a multiplicity of electric heating elements;
    a multiplicity of electronic switches, one associated with each of said heating elements and interposed between a power source and the associated heating element;
    thermometry means, associated with said heating elements, for measuring the temperatures of objects heated by each of said heating elements;
    means for setting desired temperatures for said objects;
    a multiplicity of regulator means, responsive to the thermometry means and the setting means, for controlling the electronic switches in accordance with the set temperatures to delivery power to the associated heating elements; and
    manually operable temperature drop switch means for effectively lowering the set temperatures by a predetermined amount for a plurality of said regulator means simultaneously; and wherein
    said multiplicity of regulator means are also responsive to said temperature drop switch means, for controlling the electronic switches in accordance with the set temperatures to delivery power to the associated heating elements.

6. An apparatus for controlling the delivery of power from a power source to a plurality of electric heating elements, said apparatus comprising:
    a plurality of electronic switches for delivering power from a power source to a plurality of heating elements;
    a plurality of temperature sensors associated with said heating elements;
    control means, responsive to said temperature sensors, for activating said electronic switches to provide a desired level of heat output; and
    selection means coupled to said electronic switches for selectively delivering either the output from each of said switches to a different heating element to deliver relatively low power to each heating element, or the output from at least two of said electronic switches to one of said heating elements to deliver relatively high power to the one heating element; and wherein
    each switch comprises a triac, the control means includes a plurality of regulating circuit means for activating said switches at phase angles corresponding to the desired levels of heat output, and the selection means includes means for switching one of the regulator circuit means in power transportation with at least one other of the regulator circuit means to deliver the power from the associated electronic switches to the one heating element; and
    the delivery means includes a terminal strip having terminals associated with each of the regulator means and switches, and means for interconnecting the terminals to select which of the regulator circuit means are coupled together to deliver power to said one heating element.

7. An apparatus for controlling the delivery of power from a power source to a plurality of electric heating elements, said apparatus comprising:
    a plurality of electronic switches for delivering power from a power source to a plurality of heating elements;
    a plurality of temperature sensors associated with said heating elements;
    control means, responsive to said temperature sensors, for activating said electronic switches to provide a desired level of heat output; and
    selection means coupled to said electronic switches for selectively delivering either the output from each of said switches to a different heating element to deliver relatively low power to each heating element, or the output from at least two of said electronic switches to one of said heating elements to deliver relatively high power to the one heating element; and wherein
    each switch comprises a triac, the control means includes a plurality of regulating circuit means for activating said switches at phase angles corresponding to the desired levels of heat output, and the selection means includes means for switching one of the regulator circuit means in power transposition with at least one other of the regulator circuit means to deliver the power from the associated electronic switches to the one heating element; and further comprising
    second selection means, coupled to said plurality of regulating circuit means, for programming a relay operation on a desired regulating circuit.

8. An apparatus for controlling the delivery of power from a power source to a plurality of electric heating elements, said apparatus comprising:

a plurality of electronic switches for delivering power from a power source to a plurality of heating elements;
a plurality of temperature sensors associated with said heating elements;
control means, responsive to said temperature sensors, for activating said electronic switches to provide a desired level of heat output; and
selection means coupled to said electronic switches for selectively delivering either the output from each of said switches to a different heating element to deliver relatively low power to each heating element, or the output from at least two of said electronic switches to one of said heating elements to deliver relatively high power to the one heating element; and wherein
said control means includes processor means, responsive to said temperature sensors and to set temperature values programmed into said processor means, for controlling the amounts of power delivered to said heating elements via said electronic switches to attain said set temperatures; and further comprising
a plurality of manually operated temperature set switches, and wherein the control means further includes at least ten regulating circuits interposed between said processor means and said electronic switches, each of said regulating circuits being responsive to a first, common control signal produced by said processor means, a non-common, second control signal produced by an associated temperature sensor and a non-common, third control signal produced by an associated temperature set switch, said first, common control signal providing common control of said regulating circuits.

* * * * *

UNITED STATES PATENT AND TRADEMARK OFFICE
CERTIFICATE OF CORRECTION

PATENT NO. : 4,908,498
DATED : March 13, 1990
INVENTOR(S) : Erkki Kivelä

It is certified that error appears in the above-identified patent and that said Letters Patent is hereby corrected as shown below:

In claim 1, column 7, line 9, please insert the word -- each -- before "heating".

In claim 2, column 7, line 19, please delete "transportation" and replace with -- transposition --.

In claim 5, column 7, lines 54 and 64, please delete "delivery" and replace with -- deliver --.

In claim 6, column 8, lines 22-23, please delete "transportation" and replace with -- transposition --.

Signed and Sealed this

Nineteenth Day of March, 1991

Attest:

HARRY F. MANBECK, JR.

*Attesting Officer*     *Commissioner of Patents and Trademarks*